United States Patent [19]

Cheung

[11] Patent Number: 5,075,776

[45] Date of Patent: Dec. 24, 1991

[54] METHOD OF ELECTRONICALLY STABILIZING A VIDEO IMAGE HAVING VIBRATION-INDUCED JITTER

[75] Inventor: Frank N. G. Cheung, Agoura, Calif.

[73] Assignee: Hughes Aircraft Company, Los Angeles, Calif.

[21] Appl. No.: 536,853

[22] Filed: Jun. 12, 1990

[51] Int. Cl.$^5$ .............................................. H04N 5/228
[52] U.S. Cl. ................................... 358/222; 358/167; 358/177
[58] Field of Search ............... 358/166, 167, 177, 180, 358/340, 336, 36, 37, 222, 125, 126, 105, 106; 250/201.2

[56] References Cited

U.S. PATENT DOCUMENTS

| | | | |
|---|---|---|---|
| 4,403,256 | 9/1983 | Green et al. | 358/222 |
| 4,410,914 | 10/1983 | Siau | 358/222 |
| 4,476,494 | 10/1984 | Tugayé358 | 222/ |
| 4,837,632 | 6/1989 | Kubo et al. | 358/222 |

Primary Examiner—James J. Groody
Assistant Examiner—Tuan V. Ho
Attorney, Agent, or Firm—William J. Streeter; Wanda K. Denson-Low

[57] ABSTRACT

A method of electronically stabilizing an image in the presence of jitter. The jitter induced error is measured prior to the beginning of each active sampling window signal and the error is computed into a corresponding number of pixel clock signal periods. The jitter is compensated for by advancing or delaying the occurrence of the beginning of each active sampling window signal relative to the transaction edge of the frame reference signal by the number of pixel clock signal periods. The jitter induced error is measured prior to the sampling edge of each active sample signal within each active sampling window signal. The error is converted into a corresponding number of pixel clock signal periods. The occurrence of the sampling edge of each subsequent active sample signal is advanced or delayed by the number of pixel clock signal periods corresponding to the jitter induced error. Thus, the sampling of the image is locked to the measured jitter and the image is stabilized in the presence of the jitter. The jitter error measurements are sampled once, twice, or more times prior to the field active starting edge. Error signals from a plurality of sources such as a scanner motor and a turret servo may be combined and compensated for together. The method of the invention may be employed to compensate for azimuth jitter, vertical jitter, or jitter with reference to any chosen axis.

4 Claims, 1 Drawing Sheet

METHOD OF ELECTRONICALLY STABILIZING A VIDEO IMAGE HAVING VIBRATION-INDUCED JITTER

BACKGROUND

The present invention relates to scanning video imaging systems and, more particularly, to electronically stabilizing a video image having vibration-induced jitter.

Image stabilization is essential to all scanning video image systems. In one particular example, a system is operated under vigorous vibrational conditions, such as occur in a helicopter environment. The system includes a scanner in which the scanning speed may vary and thus cause the video image to jitter. Furthermore, the scanner is located inside a turret, which has a servo loop that is unable to hold the turret at its selected position. This results in the actual turret line of sight jittering about the desired turret line of sight. Because of scanner scan position jitter and turret line of sight position jitter, a different outside scene, rather than the nominal scene, images on the detector.

Since system active sampling periods are generated from internal timing references independent of the jitter, the system active sampling window may start when the scanner is not at its expected starting position, and when the turret is not at the desired turret line of sight. This causes an image shift. Moreover, the incoming detector scene may also be distorted due to instantaneous scanner scan position jitter. The combination of these distortions produces a distorted frame, and the integral of these distorted frames produces a distorted picture. Furthermore, the jitter is two-dimensional. Picture distortion occurs in both vertical and horizontal directions.

Heretofore, several attempts have been made to solve the scanner jitter problem. One approach relied on the generally constant frequency of the master clock to govern the sampling process. The method thus sought to alter the frequency of the system master clock according to scanner speed. This was done by locking the system master clock to the scanner speed by means of a phase locked loop. By doing so, periods of active sampling could vary according to scanning speed variation, and hence stabilize the video picture. This approach required scanners with tight tolerance structures which increase system initial cost and life cycle cost. Moreover, the method could only handle jitter frequencies much below the bandwidth of the phase locked loop.

Another approach relied on the existence of active sample pulses controlling image sampling on a frame to frame basis. This approach altered current frame active sample pulses based on scanner speed measurements collected from previous frames. This method was based on the assumptions that the scanner scanning speed was relatively stable from frame to frame, and that the scanning speed would follow the same accelerating and decelerating paths in each frame. Since these schemes did not compensate for scanner jitter on a real time basis, they did not work well. Under vigorous vibration neither of the two approaches performed as desired.

In regard to turret line of sight jitter, the servo errors are very difficult to compensate. They are usually regarded as being uncompensatable in the scanning system. They are treated as mechanical jitter which should be compensated for by the servo engineers. Turret jitter has large jitter amplitude and high jitter frequencies. Turret line of sight jitter is usually compensated for by electromechanical devices.

One prior attempt to compensate for turret jitter employed a bi-axial high speed, high resolution electro-optical compensation mirror. This biaxial mirror was compact in size and provided compensation in both the azimuth and the vertical direction. However, it was extremely expensive. A bi-axial electro-optical compensation mirror costs ten times as much as a single axis mirror. Furthermore, due to the nature of the bi-axial compensation mirror, the video image or picture produced on the monitor rotates about its own center when the bi-axial compensation mirror is used. This phenomenon becomes more and more obvious as vibration gets greater.

To avoid these disadvantages, a dual single axis mirror was employed for jitter compensation. This mirror arrangement had separate mirrors for azimuth and vertical compensation. Jitters in the azimuth and vertical direction were compensated independently. This solved the image rotation problem and it was also less expensive than the bi-axial mirror. However, the dual single axis mirror requires more electronics and requires a larger turret size. Furthermore, the dual single axis mirror is less reliable.

Accordingly, it is an objective of the present invention to provide all electronic jitter compensation for a video imaging system that will compensate both for servo position residual error caused by turret motion jitter and for scanner motor jitter.

SUMMARY OF THE INVENTION

By electronically altering the active sampling time of a scanning video image system, this invention provides a method to stabilize the video image in the azimuth direction against any optical scene jitter due to mechanical vibrations. The principles of the present invention may also be applied to compensation for jitter error relative to the vertical axis or any other chosen axis. It is not limited to jitter compensation in the azimuth direction. The jitter compensation method of the present invention is all electronic and does not employ electro-optical compensation devices. The principle of this invention is to electronically shift the system active sampling window and to alter the system active sampling periods within the active sampling window according to the instantaneous jitter. By doing so, the system active sampling time locks to the jitter and hence eliminates the picture jitter problem.

The video imaging system is provided with a basic time reference in terms of pixel reference clock periods. The system has frame reference signals that are synchronized to the pixel reference clock periods and in addition it generates a field active signal having field active starting edges that normally occur a predetermined number of pixel reference clock periods after the occurrence of the transaction edge of each of the frame reference signals. These field active signals represent a sampling window. During the period of each field active signal there occur a plurality of active sample signals having transaction edges that normally occur a predetermined number of pixel reference clock periods after the transaction edge of each active sample signal.

The jitter error is measured and computed into a corresponding number of pixel reference clock periods. The jitter error measurements are sampled prior to the field active starting edge of each field active signal. The error may be sampled once, or twice, or more times, all depending on the algorithm. The algorithm may be different from frame-to-frame. The predicted future value of the jitter error is computed based on the previous samples of jitter error measurements, as it will occur at the nominal field active starting edge. The occurrence of the field active starting edge of the field active signal is advanced or delayed relative to the frame reference transaction edge of the frame reference signal by the number of pixel reference clock periods corresponding to the previously predicted jitter error. The expected future value of jitter error is computed based on the previous measurements within the same active sample period, as it will occur at the next nominal active sample transaction edge. The occurrence of the active sample transaction edge of each subsequent active sample signal is advanced or delayed by the number of pixel reference clock periods corresponding to the previously predicted jitter error.

Thus, the sampling of the video image is locked to the measured jitter and the video image is stabilized in the presence of the jitter. Since there is no phase locked loop involved in this invention, the bandwidth limiting disadvantage of conventional solutions is avoided, and jitter compensation frequency up to half of the scanner position reference signal frequency is achievable. Moreover, this invention is not based on information collected from previous frames, but rather, it provides real time jitter compensation, and therefore, this invention performs better than existing methods.

The present method is different from the signal-invariant-frequency-varying method used in prior attempts to solve the jitter problem. The present invention uses a signal-varying-frequency-invariant approach to solve the problem from a completely reversed point of view—by electronically altering the active sampling time rather than varying the master clock frequency to compensate for scanning speed jitter.

The method of the present invention provides two stages of compensation within a field which includes active sampling window signal starting point compensation, and active sampling period compensation during active sampling window signals. Under normal conditions, with no jitter, the starting edge of the active sampling window signal is always a predetermined number of pixel clock signal periods away from the edges of the frame reference signal. When there is jitter, the relationship between the starting edge of the active sampling window signal and transaction edges of the frame reference signal is varied as a function of jitter. Furthermore, and under normal conditions, with no jitter, the period of the active sample signals is always a predetermined number of pixel clock signal periods in length or duration. When there is jitter, the period of the active sample signals is varied as a function of jitter.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

It will be understood that the principles of the electronic jitter compensation method of the present invention are generally applicable to any kind of jitter in a scanning video image system. To illustrate the application of the principles of the present invention, an exemplary scanner stabilization is described below.

Figure 1:
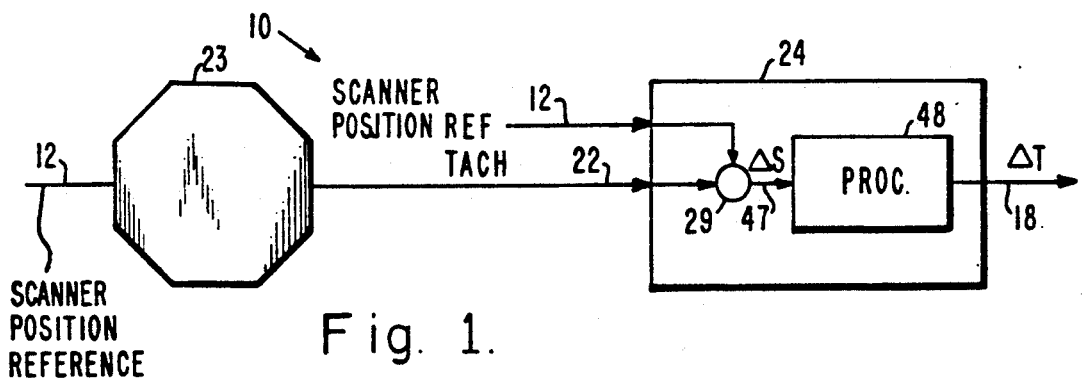
FIG. 1 is a schematic diagram of a portion of a video imaging system which incorporates the stabilization system in accordance with the principles of the present invention.

Referring now to FIG. 1 of the drawings, there is shown a schematic diagram of a portion of a video imaging system 10 which utilizes the stabilization method of the present invention. The system 10 includes a scanner 23 and a signal processing means 24. The scanner 23 is adapted to periodically sweep across a target scene by changing the angle with respect to incoming optical energy. The periods of the scanner sweeps follow the underlying frame rate of the video imaging system 10 and comprise one axis of the video picture. The scanner 23 is driven by a motor (not shown) which is adapted to provide a nomimal constant scanner speed necessary to maintain the desired video frame rate. However, if the scanner speed is not constant due to system imperfections and environmentally induced disturbances, then jitter occurs in the video picture. The scanner 23 is adapted to receive a scanner position reference signal 12 indicative of desired scanner position at an input lead, and is adapted to provide a tach signal 22 which is indicative of the actual scanner position at an output lead.

The signal processing means 24 is provided with two input leads connected to signal comparison means 29. The output of the comparison means 29 is applied to a signal processing circuit 48, the output of which appears at an output lead of the signal processing means 24. The scanner position reference signal 12 and the tach signal 22 are applied to the input leads of the signal processing means 24. At the output lead of the signal processing means 24 appears a field active error signal 18 which is adapted to control image sampling in order to compensate for jitter.

In operation, the scanner position reference signal 12 drives the scanner 23 synchronously, thus seeking to achieve a constant speed. The scanner 23 provides the output tach signal 22 indicating the actual position of the scanner 23, a position which includes components of jitter. The tach signal 22 is compared to the scanner position reference signal 12 in the signal comparison means 29 to obtain an error signal 47. This error signal 47, formed from the actual position and the desired position of the scanner 23, is a true measure of jitter disturbances. The signal processing circuit 48 operates on the error signal 47 to translate this error signal 47 into a format consistent to that of a sampling circuit (not shown). Since the sampling signals of the sampling circuit are generated based on internal timing references, the error signal 47 is converted to the field active error signal 18 utilizing the same timing references or clock frequency as that of the sampling signals. In this manner the field active error signal 18 may be used to shift the sampling signals according to the measured jitter disturbance.

For purposes of this description, some signals are discussed as if they were single signals or pulses, but it should be understood that the signals are groups or trains of signals instead of single signals. This statement refers to the scanner position reference signals 12, the field active error signal 18 and the tach signal 22.

Figure 2:
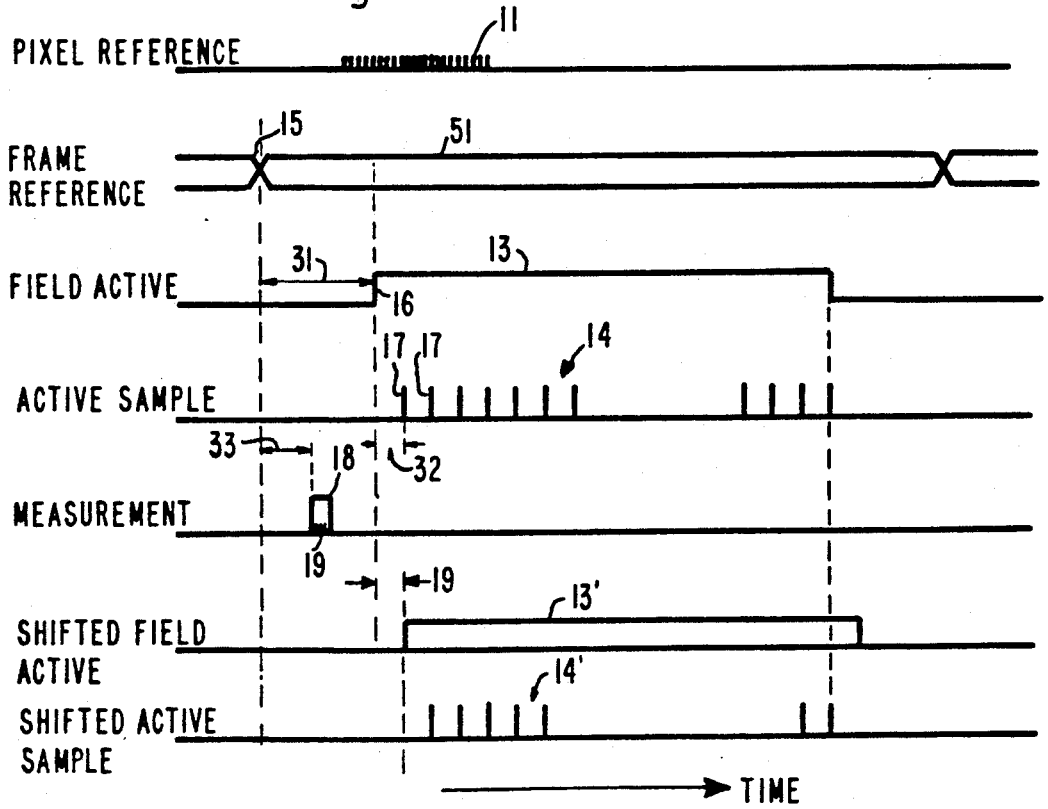
FIG. 2 is a timing diagram showing the relationship of jitter error and video image sampling which illustrate the frame adjustment method of this invention.

Referring now to FIG. 2 of the drawings taken in conjunction with FIG. 1, there is shown a timing diagram of the signals which control the video image sampling. In FIG. 2, time is along the abscissa and signal levels are along the ordinate. The first or top-most waveform is a continuous train of pixel reference clock signals 11 which provide the basic timing of the system 10. For convenience, only a portion of the continuous train is shown. The second waveform is also a continuous train of pulses but only one frame reference signal 51 is shown in FIG. 2 beginning with a frame reference transaction edge 15. This frame reference signal 51 defines the basic scanning period of the imaging system 10. The third waveform is a field active signal 13 begining with a field active starting edge 16. This field active signal 13 defines the active sample region of the imaging system 10. The field active signal 13 is substantially centered on the frame reference signal 51 by a nominal field active delay 31 of the field active starting edge 16 relative to the frame reference transaction edge 15.

The fourth waveform is a set of active sample signals 14 contained within the field active signal 13. The set of active sample signals 14 starts within the envelope of the field active signal 13 after a nominal active sample delay 32. The active sample delay 32 is measured between an active sample sampling edge 17 and the field active starting edge 16. The fifth waveform is the field active error signal 18 from the output of the signal processing means 24. The error is expressed in a field active measurement timing 33 relative to the frame reference transaction edge 15 and a field active error magnitude 19 expressed in counts of pixel reference clock periods. The sixth waveform is a shifted field active signal 13' derived from a nominal field active signal 13. The starting edge of the shifted field active signal 13' relative to the nominal field active signal 13 is shifted in response to measured jitter error. The seventh or bottommost waveform is shifted active sample signals 14' that are within the shifted envelope of the field active signal 13'.

In operation under normal conditions, there is no scanning speed jitter affecting the scanner 23. Accordingly, the field active error signal 18 from the output of the signal processing means 24 is zero. Thus, in the nominal operation, the field active starting edge 16 of the field active signal 13 is always a predetermined number of pixel reference clock periods away from the frame reference transaction edge 15 of the frame reference signal 51. Thus, the field active signal 13 always lags the frame reference signal 51 by a constant time delay indicated by the nominal field active delay 31. Similarly, the active sample signals 14 are started within the envelope of the field active signal 13 after a constant nominal active sample delay 32.

When jitter is present, the method of the present invention provides for electronically shifting the field active signal 13 relative to the frame reference signal 51, and for shifting the set of active sample signals 14 within the field active signal 13 according to the instantaneous scan position jitter of the scanner 23. By doing so, the active sampling time of the system 10 locks to the scanning speed jitter and hence, eliminates the picture jitter problem.

The jitter stabilization is accomplished as follows. Since the system active sampling periods are generated from internal timing references independent of the jitter, the field active signal 13, which corresponds to the system active sampling window, may start when the scanner 23 is not at its expected starting position, and hence causes an image shift. Referring now to FIG. 1, the tach signal 22 from the scanner 23 speeds up or slows down. The signal comparison means 29 within the signal processing means 24 detects a difference in position $\Delta S$ with respect to the scanner position reference signal 12. The signal processing circuit 48 operates on the resulting error signal 47 to translate the error signal 47 to a difference in time $\Delta T$. The result is the field active error signal 18. Both the field active measurement timing 33 and the field active error magnitude 19 of the field active error signal 18 are indicated in the fifth waveform of FIG. 2. The field active error magnitude 19 measured in pixel reference clock periods is next added (or subtracted, as the case may be) to the nominal field active delay 31. The result is that the field active signal 13 is shifted according to the resultant delay and thus according to the jitter. The resulting signal is shown in the sixth waveform of FIG. 2 as the shifted field active signal 13'. The active sample signals 14, by utilizing an unchanged nominal active sample delay 32, follow the reference of the shifted field active signal 13' and are thus themselves shifted the same amount of time. The resulting shifted active sample signals 14' are shown in the seventh waveform of FIG. 2.

The jitter compensation described above compensates for shifting of the scene to the right or to the left due to scanning position shift. The video imaging system 10 is also subject to another type of error which is corrected in accordance with the principles of the present invention. The incoming detector scene is distorted due to instantaneous scanner scan position jitter caused by instantaneous scanning speed jitter. A distorted scene is stabilized by changing the active sampling periods, as described below. Thus, there are two stages of compensation. The first is compensation of the starting point of the field active signal 13 as described above, and the second is compensation of the active sampling periods by altering the active sample signals 14 as described below.

Figure 3:
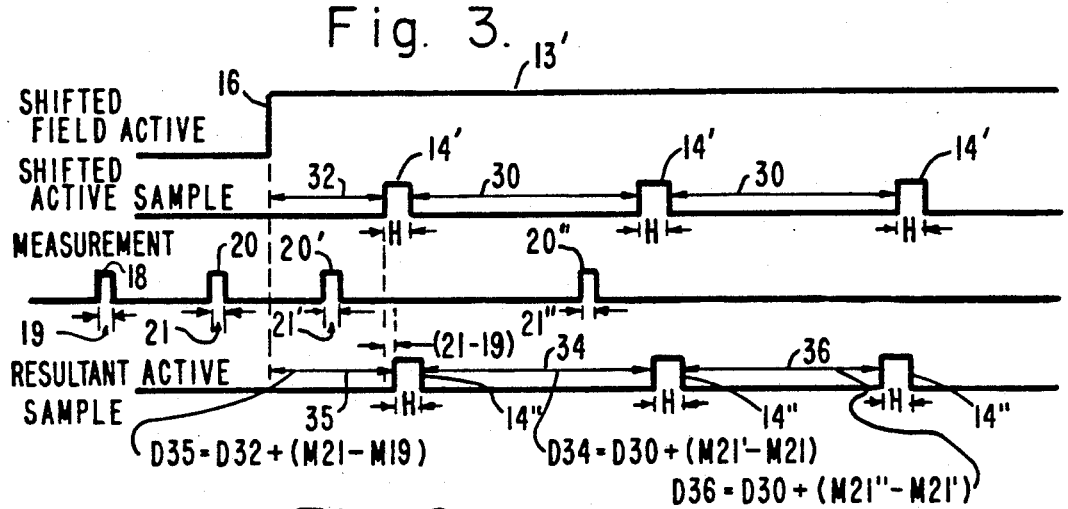
FIG. 3 is a timing diagram showing the relationship of instantaneous jitter measurements and the method of making corresponding adjustments of individual sample pulses in accordance with this invention.

Referring now to FIG. 3 of the drawings, there is shown a magnified timing diagram of the signals which control the video image sampling. In FIG. 3, time is along the abscissa and signal levels are along the ordinate. Three waveforms from FIG. 2 are shown in FIG. 3, but are greatly expanded in scale along the abscissa. The first or topmost waveform in FIG. 3 is the shifted field active signal 13', including the field active starting edge 16. The second waveform is the shifted active sample signals 14'. The active sample delay 32 is measured from the field active starting edge 16 to the sampling edge of the first of the shifted active sample signals 14'. The third waveform is the field active error signal 18 from the output of the signal processing means 24 shown in FIG. 1. The magnitudes of the errors are indicated by the field active error magnitude 19. The fourth waveform in FIG. 3 is the resultant active sample signals 14''.

When jitter is present due to instantaneous scanner speed variations, the method of the present invention provides for independently shifting individual members of the set of shifted active sample signals 14' based on error measurements taken immediately prior to each member signal. That is, the instantaneous video sampling time is offset in order to aperture-correct outside world data to compensate for vibration. This is achieved by varying the period of the sample clock according to different jitter situations which produces compression and expansion of the video sampling period.

In operation under normal conditions with no scanner scan position jitter, the period of the shifted active sample signals 14' is always a predetermined number of pixel reference clock periods. This is illustrated by the second waveform of FIG. 3 where the shifted active sample signals 14' are seen to be evenly spaced apart by a constant time duration 30. This time duration 30 is measured in terms of pixel reference clock periods (FIG. 2). The high time duration H of each of the shifted active sample signals 14' is the same. When there is scanner scan position jitter, the period of the shifted active sample signals 14' is varied as a function of scanner scan position jitter. The jitter stabilization is described below with a simple example of active sample timing based on measurements of jitter error and the assumption that jitter error at the instant of image sampling is unchanged from the jitter error at the time of measurement. The description is illustrated by the timing events shown in FIG. 3.

At the start of an imaging frame, the field active error signal 18 from the signal processing means 24 is sampled. This is indicated by the first pulse at the left of the third waveform. As previously described, the video imaging system 10 shifts the field active starting edge 16 of the field active signal 13 in response to the field active error signal 18, and the timing of the entire set of active sample signals 14 shifts along with the field active signal 13. This shift is not shown in FIG. 3 in order to simplify the illustration.

Immediately prior to the active sample delay 32, the scanner jitter error is again sampled as indicated by an active sample timing signal 20. A resulting active sample error signal 21 is represented by the width of the active sample timing signal 20. It is measured in terms of pixel reference clock periods. As previously explained with respect to FIG. 2, the last scanner scan position jitter (field active error magnitude 19) has already been compensated by shifting the field active starting edge 16 relative to the frame reference signal 51. Therefore, any additional scanner scan position jitter relative to the field active error magnitude 19 should be compensated by shortening or lengthening the active sample delay 32.

The result is that the first of the shifted active sample signals 14' is further shifted by the amount of (active sample error signal 21 minus field active error magnitude 19), and this is shown by a lengthened active sample delay 35 between the field active starting edge 16 and the sampling edge of the first resultant active sample signal 14". The active sample delay 35 is calculated as follows: Active Delay 35=nominal delay+(incremental delay between current and last scan position jitter)=Active Delay 32+(M21−M19), where M21 is the active sample error signal 21, and M19 is the field active error magnitude 19.

The process is repeated immediately prior to the second active sample delay. Another active sample timing signal 20' provides another sample of the active sample error signal 21', and a resultant time duration 34 is calculated according to the equation: Active Delay 34=Active Delay 30+(M21'−M21), where M21'=active sample error signal 21'. This varies the period of the shifted active sample signals 14' as shown by the compressed time duration 34 between the first and second resultant active sample signal 14". Similarly, another sampling of jitter error is made immediately prior to the third active sample delay as shown by a third active sample timing signal 20". Hence, the resultant active sample delay of the third shifted active sample signals 14' is shifted by the amount of (M21"−M21') from its predetermined time duration 30. This is shown by the time duration 36 between the second and third resultant active sample signals 14" The process as outlined continues for the duration of the imaging frame as defined by the envelope of the shifted field active signal 13' and for subsequent frames.

It will be understood that the foregoing method of stabilizing a video image may be implemented by means of software instructions programmed into an already existing computer in the video imagery system. For example, the method of the present invention was implemented on a forward looking infrared system mounted on a helicopter. The imagery system had already been designed and constructed, and it was found to have unacceptable jitter distortion. The scanner position jitter was being detected by a phase comparator circuit on a timing and phase locked loop circuit. The circuit compares rising edge differences between scanner position tach pulses and a 22.5K Hz reference signal in pixel clock resolution (444.44 nsec period). The rising edge of the 22.5K reference signal leads the transaction edge of the 30 Hz frame reference by 6.342 microseconds, which is about 15 pixel clocks.

A scanner tach jitter of 34 msec peak-to-peak (5 times scanner jitter specification of ±3 msec) was induced corresponding to 537 mrad in output space for a narrow field of view operation. The image was visibly jittering on the display and an autotracker azimuth correlation error signal output verified the extent of the motion. Tach stabilization implemented by means of the present invention then was turned on. There was no longer any discernible induced image jitter on the display and the azimuth correlation error reduced to its baseline value, indicating that the electronic scanner stabilization hardware and software implementation performs as designed. The scanner jitter compensation was tested and performance verified visually on the display for frequencies beyond the autotracker bandwidth (2 Hz) up to 200 Hz.

It should be understood that the jitter error may be sampled once or twice or more times, all depending on the algorithm. Furthermore, the algorithm may be different from frame-to-frame.

The exemplary system described above may be disposed in a turret on a helicopter, for example. The turret may have a servo loop that is unable to hold the turret at its selected position. This may result in the actual turret line of sight jittering about the desired turret line of sight. The vibration induced turret line of sight jitter error may also be compensated for in the same system described hereinabove.

An azimuth error signal is produced by the turret and applied to an operational amplifier. The operational amplifier operates as a differential amplifier and provides two output signals, an AZ+ signal and an AZ− signal. The AZ+ signal and the AZ− signal are applied to a differential amplifier filter that changes a differential input to a single-ended output and operates as a differential 200 Hz low pass filter. The analog error output of the differential amplifier and filter is applied to a multiplying digital to analog converter. The multiplying digital to analog converter acts like a digitally controlled potentiometer. It is used to apply a scaling factor to the analog error signal. The output of the multiplying digital to analog converter is coupled to an A/D converter. The output is a digital error $\Delta t$ that may be applied to the signal processing means 24.

Azimuth Residual Errors were induced in the Azimuth Stabilization Loop corresponding to 800$\mu$ radians peak to peak. In NFOV the image was visibly jittering on the display and the Autotracker Azimuth Correlation Error output verified the motion. Azimuth Servo LOS Compensation was turned on. There was no longer any discernible induced image jitter on the display and the Autotracker Correlation Error reduced to its baseline value, indicating that the Electronic Azimuth Fine Stabilization hardware and software implementation performs as designed. The Azimuth Servo LOS Compensation was tested in both fields of view at various frequencies, and visually up to 150 Hz, beyond the Autotracker bandwidth.

Thus there has been described a new and improved method of electronically stabilizing a video image having vibration-induced jitter. This all electronic jitter compensation method has general application to all image scanning systems, and has particular application to compensating for objectionable scene jitter caused by scanner motor jitter and by servo position residual error caused by turret motion jitter. The method of the present invention is useful for compensation for jitter in the azimuth direction, jitter in the vertical direction, or compensation for jitter error relative to any chosen axis. The principles of the present invention provide for combining the errors from two or more jitter sources, and provide for sampling the combined error once, twice or more times prior to altering the active sampling time of the imaging system.

It is to be understood that the above-described embodiment is merely illustrative of some of the many specific embodiments which represent applications of the principles of the present invention. Numerous and other arrangements can be readily devised by those skilled in the art without departing from the scope of the invention.

What is claimed is:

1. A method of electronically stabilizing a video image having vibration-induced jitter, said method comprising the steps of:
   generating pixel clock signals;
   generating frame reference signals synchronized to the pixel clock signals;
   generating field active sampling window signals synchronized to the pixel clock signals whose starting edges occur a predetermined number of pixel clock signal periods subsequent to the transaction edge of each frame reference signal in the absence of jitter;
   generating a plurality of active sample signals synchronized to the pixel clock signals during the period of each field active sampling window signal whose respective transaction edges occur a predetermined number of pixel clock signal periods subsequent to the transaction edges of a respective preceding active sample signal in the absence of jitter;
   measuring the jitter induced error introduced into the video image prior to the starting edge of each field active sampling window signal and converting the error into a corresponding number of pixel clock signal periods;
   advancing or delaying the occurrence of the starting edge of each field active sampling window signal relative to the transaction edge of the frame reference signal by the number of pixel clock signal periods corresponding to the jitter induced error measured prior to each field active sampling window signal;
   measuring the jitter induced error introduced into the video image prior to the sampling edge of each active sample signal within each field active sampling window signal and converting the error into a corresponding number of pixel clock signal periods; and
   advancing or delaying the occurrence of the sampling edge of each subsequent active sample signal by the number of pixel clock signal periods corresponding to the jitter induced error measured prior to each respective active sample signal;
   whereby the sampling of the video image is compensated for the measured jitter and the video image is stabilized in the presence of the jitter.

2. A method of electronically stabilizing an image having vibration-induced jitter, said method comprising the steps of:
   generating pixel clock signals;
   generating frame reference signals synchronized to the pixel clock signals;
   generating sampling window signals synchronized to the pixel clock signals whose starting edges occur a predetermined number of pixel clock signal periods subsequent to the transaction edge of each frame reference signal in the absence of jitter;
   generating a plurality of active sample signals synchronized to the pixel clock signals during the period of each sampling window signal whose respective transaction edges occur a predetermined number of pixel clock signal periods subsequent to the transaction edges of a respective preceding active sample signal in the absence of jitter;
   measuring the jitter induced error introduced into the image prior to the starting edge of each sampling window signal and converting the error into a corresponding number of pixel clock signal periods;
   adjusting the occurrence of the starting edge of each sampling window signal relative to the transaction edge of the frame reference signal by the number of pixel clock signal periods corresponding to the jitter induced error measured prior to each sampling window signal;
   measuring the jitter induced error introduced into the image prior to the sampling edge of each active sample signal within each sampling window signal and converting the error into a corresponding number of pixel clock signal periods; and
   adjusting the occurrence of the sampling edge of each subsequent active sample signal by the number of pixel clock signal periods corresponding to the jitter induced error measured prior to each respective active sample signal;
   whereby the sampling of the image is compensated for the measured jitter and stabilized in the presence of the jitter.

3. A method of electronically stabilizing a jittering image, said method comprising the steps of:

generating clock reference signals;

generating frame reference signals synchronized to the clock reference signals;

generating sampling window signals synchronized to the clock reference signals;

generating a plurality of active sample signals synchronized to the clock reference signals during the period of each sampling window signal;

measuring the jitter induced error introduced into the image prior to the starting edge of each sampling window signal and converting the error into a corresponding number of clock reference signal periods;

adjusting the occurence of the starting edge of each sampling window signal by the number of clock reference signal periods corresponding to the measured jitter induced error;

measuring the jitter induced error introduced into the image prior to the sampling edge of each active sample signal within each sampling window signal and converting the error into a corresponding number of clock reference signal periods; and adjusting the occurrence of the sampling edge of each subsequent active sample signal by the number of clock reference signal periods corresponding to the measured jitter induced error;

whereby the sampling of the image is compensated for the measured jitter and stabilized in the presence of the jitter.

4. A method of electronically stabilizing a video image having vibration-induced jitter, said method comprising the steps of:

generating pixel clock signals;

generating frame reference signals synchronized to the pixel clock signals;

generating field active sampling window signals synchronized to the pixel clock signals whose starting edges occurs a predetermined number of pixel clock signals subsequent to each transaction edge of each frame reference signal in the absence of jitter;

generating a plurality of active sample signals synchronized to the pixel clock signals during the period of each field active sampling window signal whose respective transaction edges occur a predetermined number of pixel clock signals subsequent to the transaction edge of a respective preceding active sample signal in the absence of jitter;

measuring the vibration-induced turret jitter error and converting jitter error measurements into a corresponding number of pixel reference clock signals;

sampling the jitter error measurements a plurality of times prior to the field active transaction edge of each field active signal;

computing the expected future value of the jitter error, based on the plurality of jitter error measurements;

advancing or delaying the occurrence of the field active transaction edge of the field active signal relative to the frame reference transaction edge of the frame reference signal by the number of pixel reference clock signals corresponding to the previously computed jitter error;

sampling the jitter error measurements a plurality of times prior to the active sample transaction edge of each active sample signal;

computing the expected future value of jitter error, based on the plurality of measurements; and advancing or delaying the occurrence of the active sample transaction edge of each subsequent active sample signal by the number of pixel clock signals corresponding to the previously computed jitter error;

whereby the sampling of the video image is locked to the measured jitter and the video image is stabilized in the presence of the jitter.

* * * * *